UNITED STATES PATENT OFFICE.

DAVID G. CONGER, OF NEW YORK, N. Y.

IMPROVEMENT IN COMPOSITION PAVEMENTS.

Specification forming part of Letters Patent No. 161,100, dated March 23, 1875; application filed January 14, 1875.

*To all whom it may concern:*

Be it known that I, DAVID G. CONGER, of New York, in the county of New York and State of New York, have invented certain new and useful Improvements in Paving-Blocks; and I do hereby declare the following to be a full, clear, and exact description of the invention, such as will enable others skilled in the art to which it pertains to make and use it, reference being had to the accompanying drawings, which form part of this specification.

My invention consists in a paving-block formed from materials substantially as hereinafter set forth, in which there is sufficient asphaltum or paving-pitch, or an equivalent substance, to render the mass plastic when hot, and hard when cooled to ordinary temperatures. The material, when hot, being shaped in the form to be given to the block, is then, while still hot, subjected to considerable pressure, and permitted to set while still under pressure.

The following ingredients I have found by actual test to form a superior quality of paving-block when made by this process, viz: Two barrels of paving-pitch or asphaltum, or of both combined, and four quarts of resin, together with Akron or Newark cement, sand, and field-plaster, in the proportions of one part of the cement to four of the sand, and one of the field-plaster or gypsum. To the above I add about an equal bulk of gravel, and unite the ingredients as follows: The paving-pitch or asphaltum is first boiled in any suitable vessel for some time, to remove all of its volatile elements, when to the boiling pitch are added four quarts of resin previously melted. Allow the mass to boil for an additional half-hour, or thereabout; then add a compound consisting of the one part of cement, four of sand, and one of field-plaster. Allow this to become thoroughly incorporated with the boiling mass, after which add about an equal bulk of gravel—*i. e.*, a quantity in bulk about equal to the entire mass before it is added. The mass is then permitted to boil until of the consistency of thick paste or mortar, when it is ready to be used in forming the paving-blocks, which said blocks themselves are a novel manufacture, and constitute my invention.

To construct the blocks I take a suitable quantity of the hot mass above described, and put it in a form which is of the shape desired to be given to the finished block; then, while still hot, I subject the material in the mold or form to considerable pressure—say, one ton, more or less—and maintain the pressure until the material has cooled sufficiently to set. The block is then in condition to be used, and can be handled, stored, shipped, and used the same as other blocks that are employed for paving, and is not affected by natural heat, frost, moisture, variations of temperature, &c., and is not liable to crack. Moreover, it is durable and very serviceable.

The ingredients above named may not be invariable, but are merely cited as forming a suitable compound possessing the features of forming a plastic mass when mixed and in a hot condition, but which hardens when permitted to cool down to ordinary temperatures.

The ingredients may be varied considerably, as, for instance, gas or coal tar may be rendered of suitable consistency by boiling to replace the asphaltum or paving-pitch, and so others of the ingredients may be replaced by suitable substances; or they may be mixed together in a different manner, or the proportions may be different, so there is formed a sufficiently-durable compound with the pitch or asphaltum, or its equivalent, that will become plastic when heated, but will become hard when cooled within ordinary temperatures. These substances, when in a plastic state—that is, while hot—are confined in proper molds or forms to give the desired shape to the blocks, and while still hot are subjected to pressure, and permitted to set while still under pressure, all as above described.

The product will answer all the purposes of any paving-block, whether for streets, pavements, floors, &c., and is far superior to any similar block that is formed without pressure.

I am aware of ordinary processes for making bricks which are pressed and afterward burned; but the materials of which they are made are not such as to render them plastic by heating. But I am not aware that paving-blocks have ever before been made by taking ingredients, substantially as described, that, when mixed together, are rendered plastic by heat; then shaping the materials in a suitable mold or form, and while still hot subjecting it to pressure, under which pressure it is allowed to set.

Any suitable means may be employed for imparting the required pressure; but it should be preferably a rolling pressure, and a suitable apparatus for the purpose was described by me and patented in Letters Patent of the United States No. 124,794, dated March 19, 1872.

What I claim is—

As an article of manufacture, a paving-block formed and subjected to pressure while still hot, and allowed to set while under pressure, the said block composed of a compound of ingredients consisting of pitch or asphaltum, resin, cement, sand, field-plaster, or gypsum, and gravel, in the proportions and united and compounded substantially as described—that is, plastic while hot, but hardens when cool.

In testimony whereof I have signed my name to this specification in the presence of two subscribing witnesses.

DAVID G. CONGER.

Witnesses:
 FRANCIS TOMNEY,
 H. P. HOWER.